US010611325B2

(12) United States Patent
Glickman et al.

(10) Patent No.: US 10,611,325 B2
(45) Date of Patent: Apr. 7, 2020

(54) BUMPER WITH PEDESTRIAN SAFETY FEATURES

(71) Applicant: Ford Global Technologies, LLC, Dearborn, MI (US)

(72) Inventors: David Brian Glickman, Southfield, MI (US); Michael Williams, Northville, MI (US); Sudip Sankar Bhattacharjee, Novi, MI (US); Mohammed Shenaq, Dearborn, MI (US); Mustafa Ahmed, Canton, MI (US); Harsha Kusnoorkar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 164 days.

(21) Appl. No.: 15/981,237

(22) Filed: May 16, 2018

(65) Prior Publication Data

US 2019/0152414 A1 May 23, 2019

Related U.S. Application Data

(60) Provisional application No. 62/589,183, filed on Nov. 21, 2017.

(51) Int. Cl.

*B60R 19/26* (2006.01)
*B60R 19/34* (2006.01)
*B60R 21/34* (2011.01)

(52) U.S. Cl.

CPC .............. *B60R 19/34* (2013.01); *B60R 21/34* (2013.01)

(58) Field of Classification Search

CPC .......... B63B 35/38; A61G 5/12; B60J 5/0416; E05B 79/06; E05B 85/16; B60R 1/078; B60R 1/081; B60R 1/12; A47B 55/02; H02G 3/0443

USPC .......................................................... 293/132

See application file for complete search history.

(56) References Cited

U.S. PATENT DOCUMENTS

| | | | | |
|---|---|---|---|---|
| 8,662,566 B1 * | 3/2014 | Edwards | B60R 19/24 | 293/133 |
| 9,248,795 B1 * | 2/2016 | Schnabelrauch | B60R 19/44 | |
| 9,598,033 B1 * | 3/2017 | Berger | B60R 19/03 | |
| 9,932,004 B1 * | 4/2018 | Mihm | B60R 19/18 | |
| 2003/0034661 A1 * | 2/2003 | Gotanda | B60R 19/24 | 293/155 |
| 2004/0032133 A1 * | 2/2004 | Bird | B60R 19/04 | 293/154 |
| 2013/0099514 A1 * | 4/2013 | Kaneko | B60R 19/34 | 293/133 |
| 2013/0300138 A1 * | 11/2013 | Banasiak | B60R 19/34 | 293/133 |
| 2015/0021940 A1 * | 1/2015 | Roselli | B60R 19/34 | 293/133 |
| 2015/0054312 A1 * | 2/2015 | Hisazumi | B62D 25/082 | 296/193.09 |
| 2016/0059810 A1 * | 3/2016 | Watanabe | B60R 19/24 | 293/133 |

(Continued)

*Primary Examiner* — Kiran B Patel

(74) *Attorney, Agent, or Firm* — David Coppiellie; Carlson, Gaskey & Olds, P.C.

(57) ABSTRACT

A motor vehicle according to an exemplary aspect of the present disclosure includes, among other things, a bumper having an at least partially metallic shell mounted to the vehicle by way of a mount. Further, at least a portion of the mount is configured to bend to allow movement of the shell in response to a collision. A method is also disclosed.

17 Claims, 6 Drawing Sheets

(56) References Cited

U.S. PATENT DOCUMENTS

| | | | | |
|---|---|---|---|---|
| 2016/0176442 | A1* | 6/2016 | Miyagano | B62D 21/152<br>296/193.09 |
| 2016/0347162 | A1* | 12/2016 | Shynn | B60K 5/12 |
| 2017/0113726 | A1* | 4/2017 | Matsushima | B62D 21/152 |
| 2017/0197571 | A1* | 7/2017 | Baccouche | B60R 19/34 |
| 2017/0282975 | A1* | 10/2017 | Nakauchi | B62D 25/12 |
| 2018/0147901 | A1* | 5/2018 | Cramp | B66D 1/00 |
| 2018/0170437 | A1* | 6/2018 | Park | B62D 21/152 |
| 2019/0084397 | A1* | 3/2019 | Yugami | B60K 1/04 |

* cited by examiner

BUMPER WITH PEDESTRIAN SAFETY FEATURES

RELATED APPLICATION(S)

This application claims the benefit of U.S. Provisional Application No. 62/589,183, filed Nov. 21, 2017, the entirety of which is herein incorporated by reference.

TECHNICAL FIELD

This disclosure relates to a bumper for a motor vehicle and a corresponding method. The bumper is configured to provide for increased pedestrian safety.

BACKGROUND

Motor vehicles are known to include front and rear bumpers, which are structures attached to or integrated with the front and rear ends of the vehicle, respectively. Bumpers may be made of metal, such as chrome, or plastic.

SUMMARY

A motor vehicle according to an exemplary aspect of the present disclosure includes, among other things, a bumper having an at least partially metallic shell mounted to the vehicle by way of a mount. Further, at least a portion of the mount is configured to bend to allow movement of the shell in response to a collision.

In a further non-limiting embodiment of the foregoing motor vehicle, the mount includes a bracket having at least one tab fastened to the shell, and the at least one tab of the bracket is configured to bend to allow movement of the shell in response to the collision.

In a further non-limiting embodiment of any of the foregoing motor vehicles, the shell has at least one tab fastened to the at least one tab of the bracket, and the at least one tab of the bracket and the at least one tab of the shell are configured to bend to allow movement of the shell in response to the collision.

In a further non-limiting embodiment of any of the foregoing motor vehicles, the bracket includes four tabs, the shell includes four tabs, and each of the tabs of the bracket are fastened to a respective one of the tabs of the shell.

In a further non-limiting embodiment of any of the foregoing motor vehicles, the bracket includes a forward face spaced-apart from an interior surface of the shell during normal operating conditions.

In a further non-limiting embodiment of any of the foregoing motor vehicles, the forward face is spaced-apart from the interior surface by about 40 mm.

In a further non-limiting embodiment of any of the foregoing motor vehicles, in response to the collision, the shell is configured to move relative to the forward face such that the interior surface of the shell contacts the forward face of the bracket.

In a further non-limiting embodiment of any of the foregoing motor vehicles, the shell includes an insert aligned with the bracket and projecting forward from the remainder of the shell.

In a further non-limiting embodiment of any of the foregoing motor vehicles, the forward face is spaced-apart from an interior surface of the insert by a distance greater than 40 mm.

In a further non-limiting embodiment of any of the foregoing motor vehicles, an energy absorber is mounted to the forward face of the bracket, and in response to the collision, the shell moves relative to the energy absorber such that the interior surface of the shell contacts the energy absorber.

In a further non-limiting embodiment of any of the foregoing motor vehicles, the energy absorber is a crush can.

In a further non-limiting embodiment of any of the foregoing motor vehicles, the motor vehicle includes a plate and a rail. Further, the plate is mounted to the rail, and the bracket is mounted to the plate.

In a further non-limiting embodiment of any of the foregoing motor vehicles, the bracket includes a mount face spaced rearward of the forward face, and the mount face includes a plurality of apertures configured to receive fasteners for coupling the bracket to the plate.

In a further non-limiting embodiment of any of the foregoing motor vehicles, the bracket includes four legs projecting rearward from a perimeter of the mount face, and each of the tabs of the bracket projects from a corresponding one of the legs.

In a further non-limiting embodiment of any of the foregoing motor vehicles, the bracket includes two legs projecting from a first side of the mount face and two legs projecting from a second side of the mount face opposite the first side.

In a further non-limiting embodiment of any of the foregoing motor vehicles, the tabs on the same side of the bracket project vertically away from one another.

A method according to an exemplary aspect of the present disclosure includes, among other things, absorbing impact during a collision between an object and a bumper. The bumper has a shell made at least partially of a metallic material and is mounted to a vehicle by way of a mount. Further, at least a portion of the mount is configured to bend to allow movement of the shell in response to the collision.

In a further non-limiting embodiment of the foregoing method, the mount includes a bracket having at least one tab, the shell includes at least one tab fastened to the at least one tab of the bracket, and the step of absorbing impact includes bending the at least one tab of the bracket and the at least one tab of the shell to allow movement of the shell in response to the collision.

In a further non-limiting embodiment of any of the foregoing methods, the bracket includes a forward face spaced-apart from an interior surface of the shell during normal operating conditions, and in response to the collision, the shell moves relative to the forward face of the bracket.

In a further non-limiting embodiment of any of the foregoing methods, absorbing an additional impact after the collision with an energy absorber mounted to the forward face of the bracket.

BRIEF DESCRIPTION OF THE DRAWINGS

In FIG. 2, the bumper is semi-transparent for purposes of illustration only.

FIG. 4B shows the bumper mounted to the mount of FIG. 3.

DETAILED DESCRIPTION

This disclosure relates to a motor vehicle having a bumper made at least partially of a metallic material and a corresponding method. The bumper is configured to provide for increased pedestrian safety.

Figure 1:
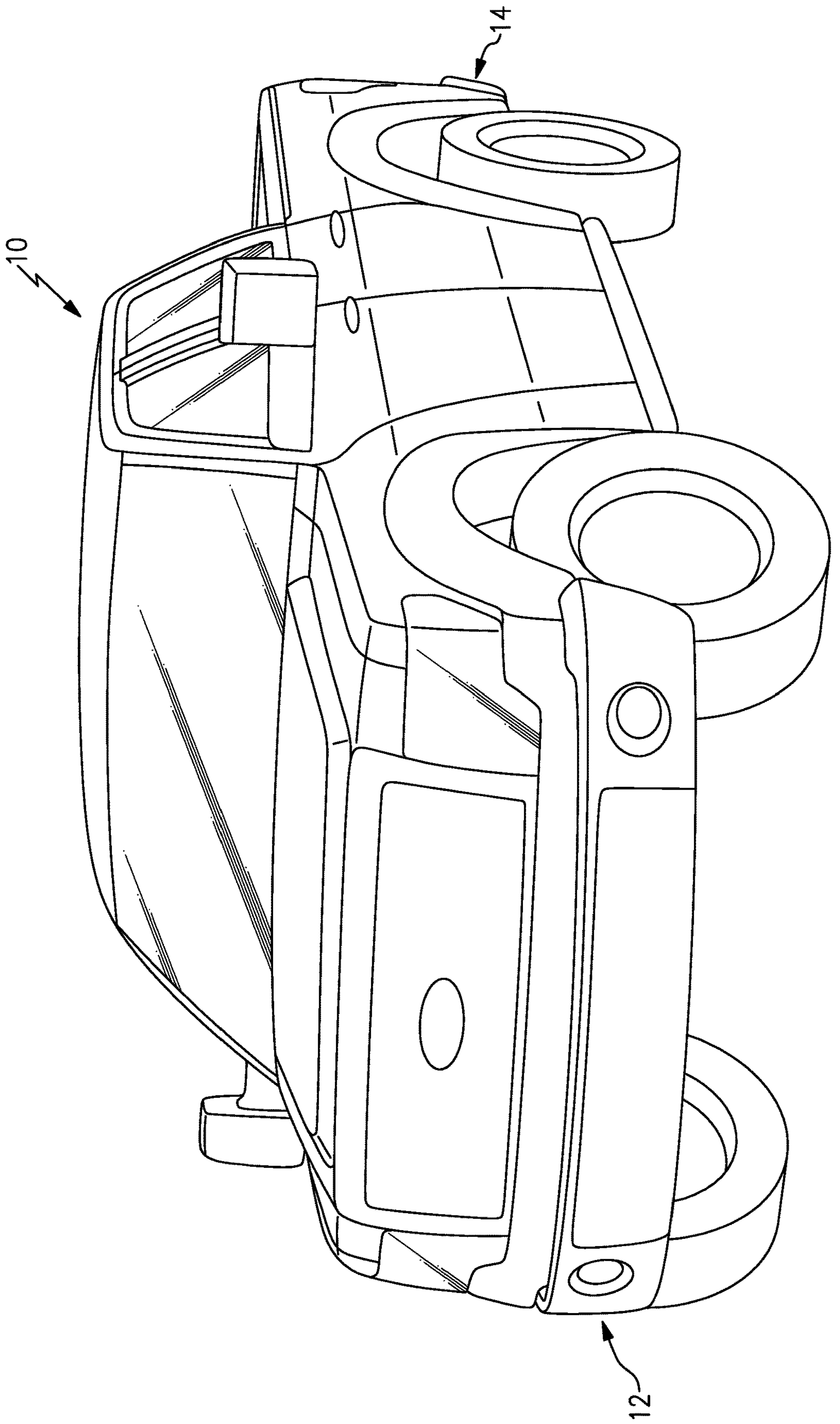
FIG. 1 is a front-perspective view of a motor vehicle, which in this example is a pickup truck.

FIG. 1 illustrates a motor vehicle 10, which in this example is a pickup truck. The vehicle 10 includes a front bumper 12 and a rear bumper 14. The front and rear bumpers 12, 14 are made at least partially of a metallic material, such as chrome. This disclosure is not limited to any particular metallic material, however. While many bumpers in today's vehicles are made of plastic, metallic bumpers still appeal to many buyers (both aesthetically and because of their function), and in particular to buyers of heavy duty vehicles such as pickup trucks. That said, this disclosure is not limited to any particular type of vehicle. For example, this disclosure also extends to vehicles such as vans, sport utility vehicles (SUVs), sedans, sports cars, etc.

Figure 2:
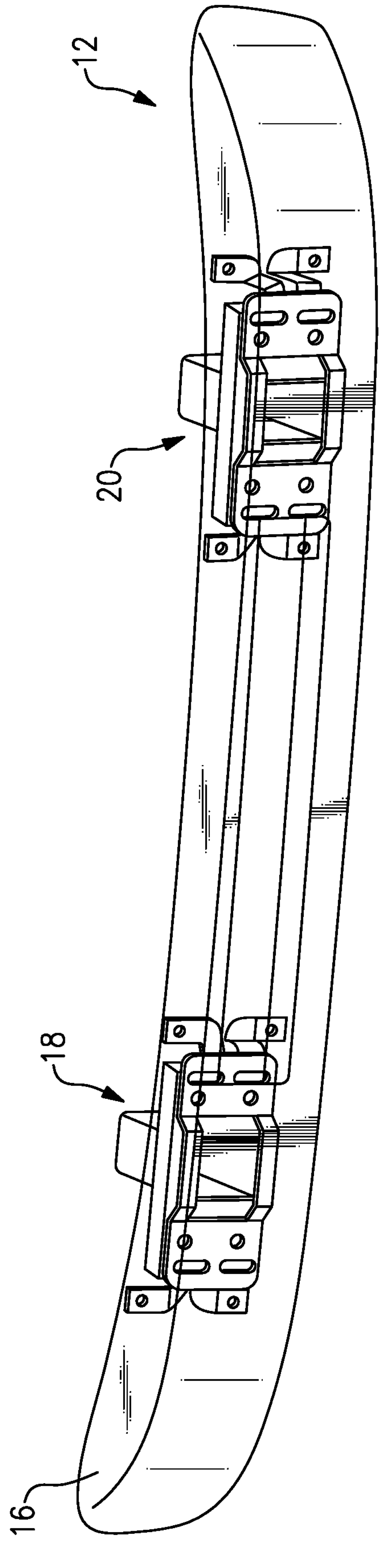
FIG. 2 is a perspective view of a front bumper of the vehicle of FIG. 1.

FIG. 2 is a front-perspective view of the front bumper 12. While the front bumper 12 is shown in FIG. 2, it should be understood that the rear bumper 14 could be arranged similarly. Thus, this disclosure is not limited to front bumpers.

The front bumper 12 includes a shell 16, which is mounted to the vehicle 10 by way of a mounting assembly, which includes first and second mounts 18, 20. The first and second mounts 18, 20 are configured to support the shell 16 relative to the front of the vehicle 10. The shell 16 is made at least partially of a metallic material, such as chrome, in this example. The shell 16 is shown semi-transparently in FIG. 2 for purposes of illustrating the arrangement of the first and second mounts 18, 20 relative to the shell 16.

Figure 3:
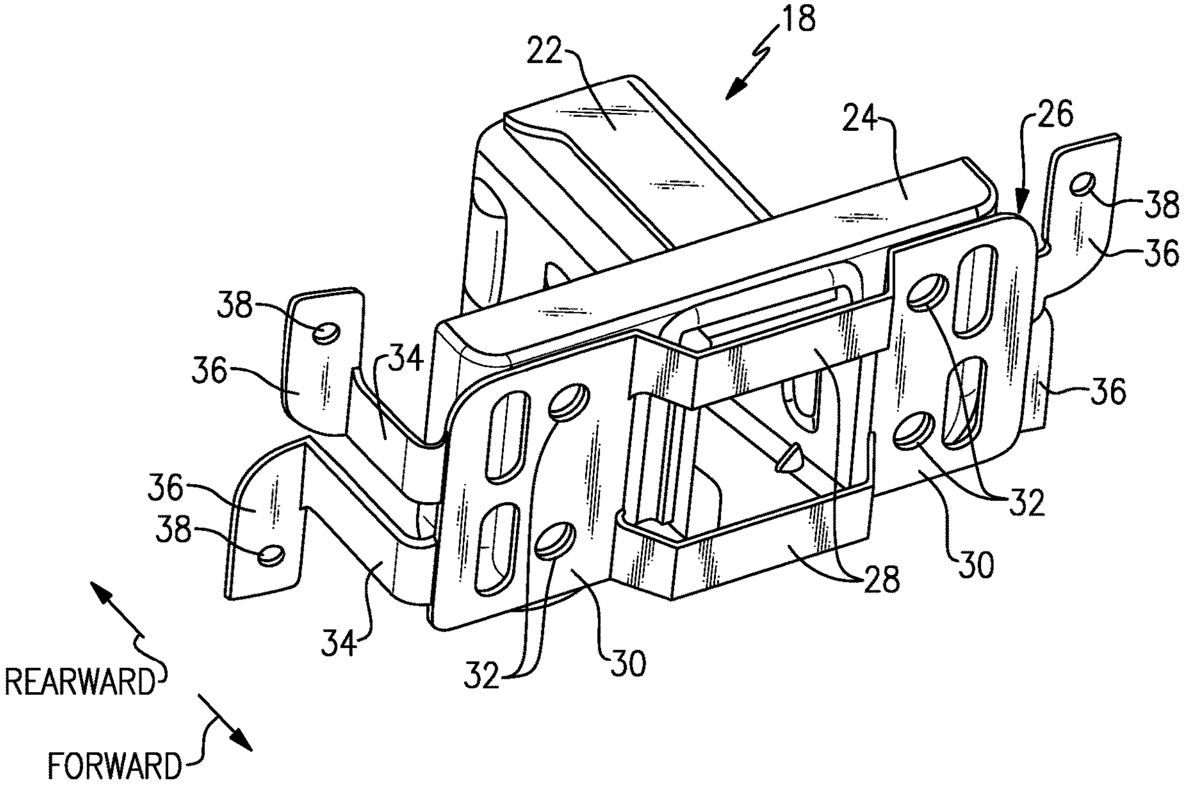
FIG. 3 is a perspective view of a mount.

FIG. 3 is a perspective view of the detail of the first mount 18. The first mount 18 is shown in isolation in FIG. 3 for purposes of illustration. While only the first mount 18 is shown, it should be understood that the second mount 20 is arranged substantially similar to the first mount 18.

In this example, the first mount 18 includes a rail 22, a plate 24, and a bracket 26. The bracket 26 is mounted to the plate 24, which in turn is mounted to the rail 22. The rail 22 is affixed to the vehicle 10. The rail 22 may be provided by a fixed vehicle structure such as a portion of the frame of the vehicle 10.

The bracket 26 includes a forward face 28, which lies in a plane, and provides a forward-most face of the bracket 26. The bracket 26 further includes a mount face 30, which is spaced rearward from the forward face 28. The "forward" and "rearward" directions are labeled in FIG. 3 for ease of reference. The mount face 30 includes a plurality of apertures 32 for receiving fasteners that couple the mount face 30 to the plate 24.

A plurality of legs 34 project rearwardly from an outer perimeter of the mount face 30. In this example, there are four such legs 34. Only two legs are visible in FIG. 3, but it should be understood that two similar legs are provided on the opposite side of the mount face 30. The legs 34 are spaced-apart from one another in a vertical direction (e.g., up-and-down, relative to FIG. 3). A tab 36 with an aperture 38 projects from each of the legs 34. The tabs 36 lie in planes that are normal to the length of the legs 34. In particular, the tabs 36 lie in planes parallel to the forward face 28 and the mount face 30.

The tab 36 of the upper leg 34 projects from the leg 34 in an upward direction, while the tab 36 of the lower leg 34 projects in a downward direction. In other words, the tabs 36 on the same side of the bracket 26 project vertically away from one another. The apertures 38 are configured to receive a fastener that couples the tabs 36 to the shell 16.

Figure 4A:
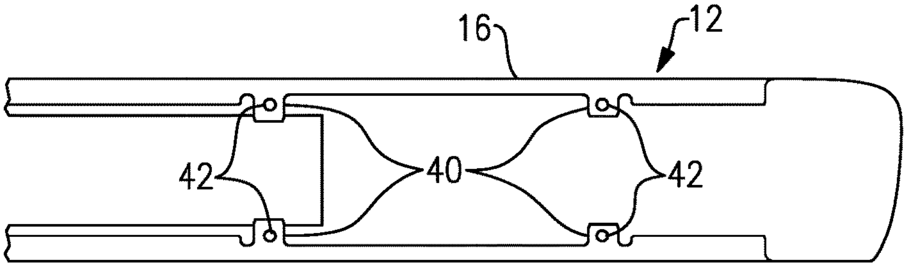
FIG. 4A is a rear view of one side of the bumper.
Figure 4B:
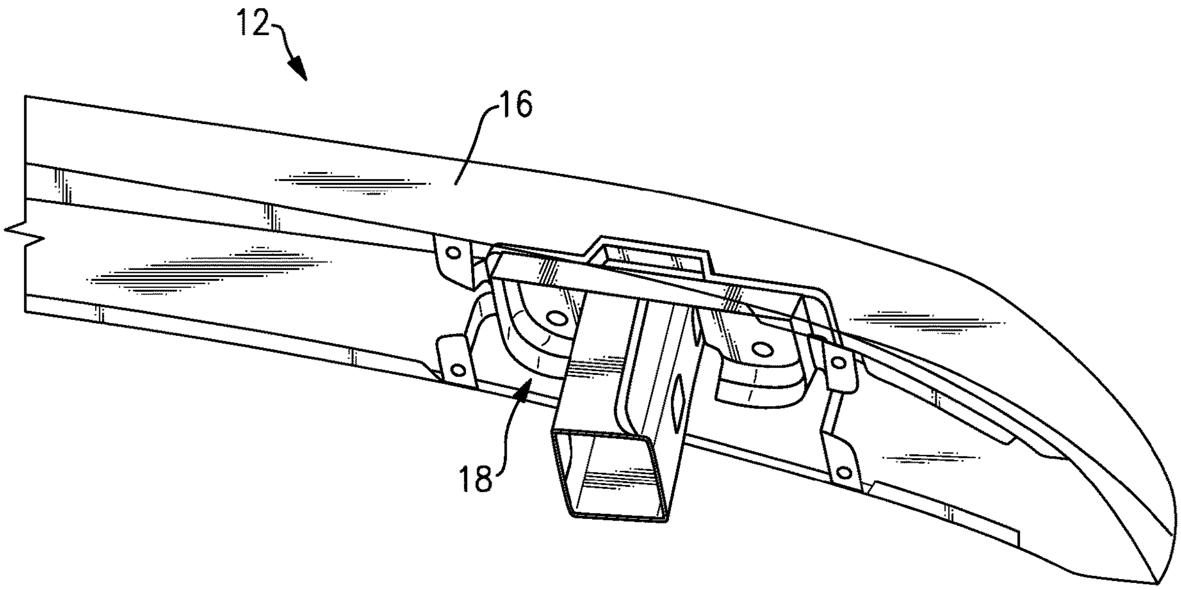
FIG. 4B is a rear-perspective view of one side the bumper.

FIG. 4A is a rear-view of the bumper 12. As shown, the shell 16 includes a plurality of tabs 40 having apertures 42, which correspond to the tabs 36 and apertures 38 of the legs 34. Two of the tabs 40 project from an upper, rear edge of the shell 16, while two of the tabs 40 project from a lower, rear edge of the shell 16. As generally shown in FIG. 4B, the shell 16 is mounted to mount 18 by aligning the tabs 36, 40 and apertures 38, 42, and fastening the tabs 36, 40 together. This disclosure is not limited to any particular type of fasteners.

The shell 16, including the tabs 40, and the bracket 26, including the tabs 36, are formed of metal in this example. The tabs 36, 40 are bendable and deformable. Specifically, the tabs 36, 40 are plastically deformable. In particular, in response to a collision between the shell 16 and an object, the tabs 36, 40 are configured to bend rearward. Doing so allows the shell 16 to move rearward independent of the vehicle 10, which mitigates the force applied to the object, such as a pedestrian, involved in the collision, and further mitigates the force that is transmitted to the vehicle 10. In this way, the front bumper 12 is configured to absorb impact of a collision and provides a pedestrian safety feature.

Figure 5A:
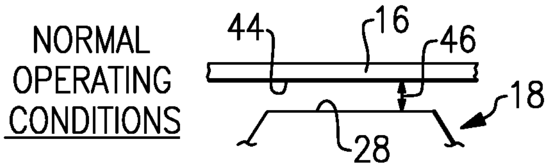
FIG. 5A schematically illustrates a first arrangement of a shell and a mount during normal operating conditions.
Figure 5B:
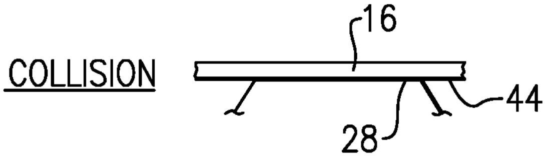
FIG. 5B schematically illustrates the first arrangement of the shell and mount after a collision.

FIGS. 5A and 5B are schematic views of a portion of the shell 16 relative to a portion of the mount 18. Specifically, FIGS. 5A and 5B illustrate the relative arrangement of the shell and the forward face 28 of the bracket 26 under both normal operating conditions and after a collision, respectively. FIG. 5A illustrates the arrangement of the forward face 28 and an interior surface 44 of the shell 16. Under normal operating conditions, there is a gap 46 between the forward face 28 and the interior surface 44. In one example, the gap 46 is about 40 mm. After a collision, however, the tabs 36, 40 bend, allowing the shell 16 to move rearwardly until the interior surface 44 contacts the forward face 28, as shown in FIG. 5B. During a collision, the shell 16 is configured to move rearward in an amount substantially equal to the gap 46, which absorbs impact and mitigates the force applied to the object involved in the collision, which, again, may be a pedestrian.

Figure 6A:
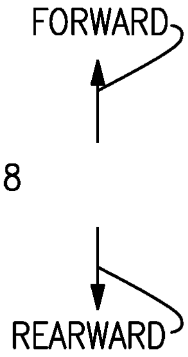
FIG. 6A schematically illustrates a second arrangement of a shell and a mount during normal operating conditions.
Figure 6A:
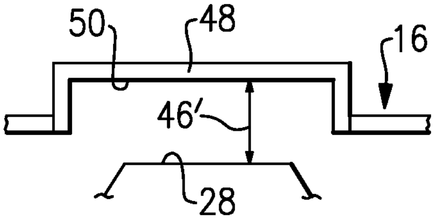
Figure 6B:
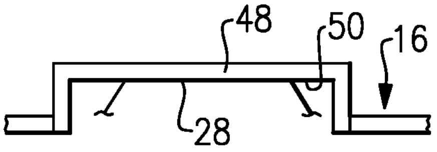
FIG. 6B schematically illustrates the second arrangement of the shell and mount after a collision.

FIGS. 6A and 6B illustrate another example arrangement wherein the gap 46 is increased relative to FIGS. 5A and 5B. In FIG. 6A, for example, the shell 16 includes an insert 48 aligned with the forward face 28. The insert 48 is configured to project forward from the remainder of the shell 16 to provide an increased gap 46' between the forward face 28 and an interior surface 50 of the insert 48. The gap 46' is greater than 40 mm in one example. The insert 48 may be made of a plastic or a metallic material, as examples. As shown in FIG. 6B, after a collision, the insert 48 is brought into contact with the forward face 28 after moving rearwardly in an amount substantially equal to the gap 46'. While both arrangements are effective, the arrangement of FIGS. 6A and 6B allows for additional travel of the shell 16 in a collision, which may mitigate greater impact forces.

Figure 7A:
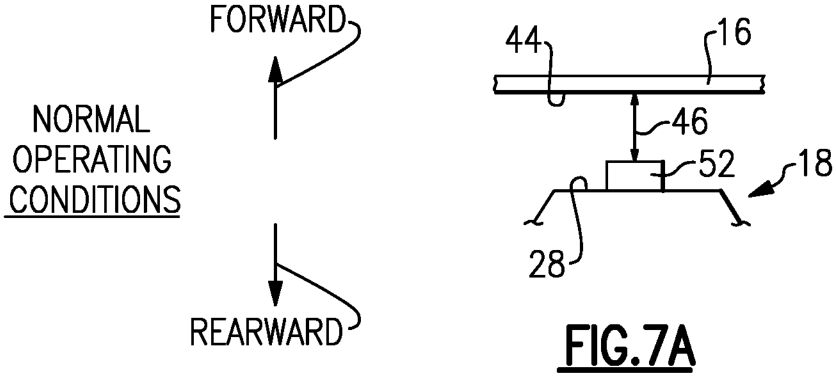
FIG. 7A schematically illustrates a third arrangement of a shell and a mount during normal operating conditions.
Figure 7B:
FIG. 7B schematically illustrates the third arrangement of a shell and a mount after a collision.

FIGS. 7A and 7B are schematic views similar to those of FIGS. 5A and 5B. In FIGS. 7A and 7B, an energy absorber 52 is mounted to the forward face 28. The energy absorber 52 is a mechanical device configured to disperse and dissipate impact energy. The energy absorber 52 may be a crush can made of a metallic or polymer material, as examples. The energy absorber 52 may be spaced apart from the shell 16 by a gap 46, which may be about 40 mm in one example. In response to an initial collision, the tabs 36, 40 bend and allow the shell 16 to travel rearward such that the interior surface 44 of the shell 16 contacts the energy absorber 52, as shown in FIG. 7B. The energy absorber 52 resists further movement of the tabs 36, 40. Thus, the bumper 12 is capable of absorbing greater impacts and/or absorbing an additional impact after an initial collision, for example.

While it is not shown in FIGS. 7A and 7B, the energy absorber 52 could be used in combination with the insert 48 of FIGS. 6A and 6B. Further, while the energy absorber 52 is mounted to the forward face 28, the energy absorber 52 may be mounted to the shell 16 in some examples.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a bumper having an at least partially metallic shell mounted to the vehicle by way of a mount, wherein at least a portion of the mount is configured to bend to allow movement of the shell in response to a collision,
wherein the mount includes a bracket having at least one tab fastened to the shell,
wherein the shell has at least one tab fastened to the at least one tab of the bracket, and
wherein the at least one tab of the bracket and the at least one tab of the shell are configured to bend to allow movement of the shell in response to the collision.

2. The motor vehicle as recited in claim 1, wherein:
the bracket includes four tabs,
the shell includes four tabs, and
each of the tabs of the bracket are fastened to a respective one of the tabs of the shell.

3. The motor vehicle as recited in claim 1, wherein the bracket includes a forward face spaced-apart from an interior surface of the shell during normal operating conditions.

4. The motor vehicle as recited in claim 3, wherein the forward face is spaced-apart from the interior surface by about 40 mm.

5. The motor vehicle as recited in claim 3, wherein, in response to the collision, the shell is configured to move relative to the forward face such that the interior surface of the shell contacts the forward face of the bracket.

6. The motor vehicle as recited in claim 3, wherein the shell includes an insert aligned with the bracket and projecting forward from the remainder of the shell.

7. The motor vehicle as recited in claim 6, wherein the forward face is spaced-apart from an interior surface of the insert by a distance greater than 40 mm.

8. The motor vehicle as recited in claim 3, wherein:
an energy absorber is mounted to the forward face of the bracket, and
in response to the collision, the shell moves relative to the energy absorber such that the interior surface of the shell contacts the energy absorber.

9. The motor vehicle as recited in claim 8, wherein the energy absorber is a crush can.

10. The motor vehicle as recited in claim 3, further comprising a plate and a rail, and wherein:
the plate is mounted to the rail, and
the bracket is mounted to the plate.

11. The motor vehicle as recited in claim 10, wherein:
the bracket includes a mount face spaced rearward of the forward face, and
the mount face includes a plurality of apertures configured to receive fasteners for coupling the bracket to the plate.

12. The motor vehicle as recited in claim 11, wherein:
the bracket includes four legs projecting rearward from a perimeter of the mount face, and
each of the tabs of the bracket projects from a corresponding one of the legs.

13. The motor vehicle as recited in claim 12, wherein the bracket includes two legs projecting from a first side of the mount face and two legs projecting from a second side of the mount face opposite the first side.

14. The motor vehicle as recited in claim 13, wherein the tabs on the same side of the bracket project vertically away from one another.

15. A method, comprising:
absorbing impact during a collision between an object and a bumper, the bumper having a shell made at least partially of a metallic material and mounted to a vehicle by way of a mount, wherein at least a portion of the mount is configured to bend to allow movement of the shell in response to the collision,
wherein the mount includes a bracket having at least one tab,
wherein the shell includes at least one tab fastened to the at least one tab of the bracket, and
wherein the step of absorbing impact includes bending the at least one tab of the bracket and the at least one tab of the shell to allow movement of the shell in response to the collision.

16. The method as recited in claim 15, wherein:
the bracket includes a forward face spaced-apart from an interior surface of the shell during normal operating conditions, and
in response to the collision, the shell moves relative to the forward face of the bracket.

17. The method as recited in claim 15, further comprising: absorbing an additional impact after the collision with an energy absorber mounted to the forward face of the bracket.

* * * * *